(12) United States Patent
Curran et al.

(10) Patent No.: US 7,234,077 B2
(45) Date of Patent: Jun. 19, 2007

(54) RAPID RESTORATION OF FILE SYSTEM USAGE IN VERY LARGE FILE SYSTEMS

(75) Inventors: Robert J. Curran, West Hurley, NY (US); Wayne A. Sawdon, San Jose, CA (US); Frank B. Schmuck, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 10/602,157

(22) Filed: Jun. 24, 2003

(65) Prior Publication Data

US 2004/0267822 A1    Dec. 30, 2004

(51) Int. Cl.
*G06F 11/00* (2006.01)

(52) U.S. Cl. .............................. 714/15; 714/6; 714/20; 707/202; 707/204

(58) Field of Classification Search .................... 714/6, 714/15, 20; 707/202, 204
See application file for complete search history.

(56) References Cited

U.S. PATENT DOCUMENTS

| | | | |
|---|---|---|---|
| 4,875,159 A * | 10/1989 | Cary et al. ................... | 707/203 |
| 5,761,677 A | 6/1998 | Senator et al. .............. | 707/203 |
| 5,991,772 A * | 11/1999 | Doherty et al. ............. | 707/202 |
| 6,032,216 A | 2/2000 | Schmuck et al. ........... | 710/200 |
| 6,041,334 A | 3/2000 | Cannon ....................... | 707/204 |
| 6,052,764 A * | 4/2000 | Mogul ......................... | 711/162 |
| 6,055,546 A | 4/2000 | Pongracz et al. ........... | 707/202 |
| 6,205,558 B1 | 3/2001 | Sobel ........................... | 714/15 |
| 6,230,239 B1 * | 5/2001 | Sakaki et al. ............... | 711/112 |
| 6,279,011 B1 | 8/2001 | Muhlestein .................. | 707/204 |
| 6,353,887 B1 | 3/2002 | Cotugno et al. ............ | 713/165 |
| 6,366,930 B1 | 4/2002 | Parker et al. ................ | 707/203 |
| 6,415,300 B1 | 7/2002 | Liu .............................. | 707/204 |
| 6,442,556 B1 | 8/2002 | Chen ........................... | 707/101 |
| 6,453,383 B1 | 9/2002 | Stoddard et al. ............ | 711/112 |
| 6,477,544 B1 | 11/2002 | Bolosky et al. ............. | 707/200 |
| 6,715,048 B1 * | 3/2004 | Kamvysselis ............... | 711/162 |
| 2002/0078244 A1 * | 6/2002 | Howard ....................... | 709/248 |
| 2002/0123997 A1 | 9/2002 | Loy et al. ........................ | 707/8 |

(Continued)

OTHER PUBLICATIONS

Basic hardware.com, Jan. 26, 2002 ☐☐http://web.archive.org/web/20020126182221/http://www.basichardware.com/glossary.html.*

(Continued)

*Primary Examiner*—Robert Beausoliel
*Assistant Examiner*—Charles Ehne
(74) *Attorney, Agent, or Firm*—Geraldine D. Monteleone, Esq.; Lawrence D. Cutter, Esq.; Heslin Rothenberg Farley & Mesiti P.C.

(57) ABSTRACT

File system restoration is made more flexible through the use of indicators of individual file restoration status throughout the restoration process. Such indicators are particularly useful in the restoration of large file systems where, for example, the number of files may range upwards of several hundred million. Since file system restoration for large systems takes such a relatively long time, the present invention provides various degrees of individual file access even as the restoration process is being carried out. During file system restoration times, file access may be full or limited to a file's attributes. Most advantageously, the present invention is capable of providing full, dynamically driven (on-demand) file access even during file system restoration operations.

28 Claims, 2 Drawing Sheets

U.S. PATENT DOCUMENTS

| | | | |
|---|---|---|---|
| 2002/0124013 A1 | 9/2002 | Loy et al. | 707/204 |
| 2002/0143734 A1 | 10/2002 | Loy et al. | 707/1 |
| 2003/0135650 A1* | 7/2003 | Kano et al. | 709/248 |
| 2004/0078641 A1* | 4/2004 | Fleischmann | 714/6 |

OTHER PUBLICATIONS

Leffler et al., "The Design and Implementation of the 4.3 BSD UNIX Operating System," Addison-Wesley Publishing Co., Inc., May 1989, ISBN 0-201-06196-1, Section 7.2, pp. 193-195.

* cited by examiner

RAPID RESTORATION OF FILE SYSTEM USAGE IN VERY LARGE FILE SYSTEMS

BACKGROUND OF THE INVENTION

The present invention is generally directed to the management of very large file systems. Such file systems are typically used in conjunction with large data processing systems. More particularly, the present invention is directed to a method and system for rapidly restoring a data file system such as might be present in a Storage Area Network (SAN) environment. Such environments are often used in conjunction with distributed data processing systems. However, the present invention is not limited to these environments.

The advent of SAN file systems and low cost storage have created the possibility of very large file systems with a very large numbers of files. In fact, file systems having capacities of several terabyte (1 terabyte=$10^{12}$ bytes=1,000 gigabytes) exist today and larger ones are possible. Unfortunately, the time to completely restore a file system from a backup copy is proportional to the file system size. Assuming 20 megabyte/second tape speeds and ignoring tape handling time and any software overhead, the restoration of 1 terabyte of data from tape would require over 10 hours. The customer has the choice of manually restoring files of particular interest first and allowing access to the file system or delaying access until all data has been restored. The first option requires that the system administrator be able to first precisely identify the desired data, since applications that access unrestored data would otherwise fail. The second option involves the delay of restoration of business until all of the files have been restored from tape. Neither of these alternatives is wholly satisfactory.

The present invention employs data structures which are also found within a related invention presented in application Ser. No. 10602156 titled "Parallel High Speed Backup for a Storage Area Network (SAN) File System," which is being filed concurrently herewith. The present invention also employs techniques found within the parallel support aspects of Hierarchical Storage management features contained within GPFS (General Parallel File System), a product sold by International Business Machines Corporation, the assignee of the present invention, in support of its pSeries product line. However, the present invention also adds new features which provide the capability of accessing backed data on an on-demand basis while still continuing a normal restoration of the file system. The present invention allows applications (that is, application programs) to begin using the file system even immediately after a file system restoration process has just begun, thereby greatly reducing the time the file system and a customer's data is unavailable.

For a better understanding of the environment in which the present invention is employed, the following terms are employed in the art to refer to generally well understood concepts. The definitions provided below are supplied for convenience and for improved understanding of the problems involved and the solution proposed and are not intended as implying variations from generally understood meanings, as appreciated by those skilled in the file system arts. Since the present invention is closely involved with the concepts surrounding files and file systems, it is therefore useful to provide the reader with a brief description of at least some of the more pertinent terms. A more complete list is found in U.S. Pat. No. 6,032,216 which is assigned to the same assignee as the present invention. This patent is hereby incorporated herein by reference. The following glossary of select terms from this patent is provided below since these terms are the ones that are most relevant in terms of providing a better appreciation and understanding of the present invention:

Data/File System Data: These are arbitrary strings of bits which have meaning only in the context of a specific application.

File: A named string of bits which can be accessed by a computer application. A file has certain standard attributes such as length, a modification time and a time of last access.

Metadata: These are the control structures created by the file system software to describe the structure of a file and the use of the disks which contain the file system. Specific types of metadata which apply to file systems of this type are more particularly characterized below and include directories, inodes, allocation maps and logs.

Directories: these are control structures which associate a name with a set of data represented by an inode.

Inode: a data structure which contains the attributes of the file plus a series of pointers to areas of disk (or other storage media) which contain the data which make up the file. An inode may be supplemented by indirect blocks which supplement the inode with additional pointers, say, if the file is large.

Allocation maps: these are control structures which indicate whether specific areas of the disk (or other control structures such as inodes) are in use or are available. This allows software to effectively assign available blocks and inodes to new files. This term is useful for a general understanding of file system operation, but is only peripherally involved with the operation of the present invention.

Logs: these are a set of records used to keep the other types of metadata in synchronization (that is, in consistent states) to guard against loss in failure situations. Logs contain single records which describe related updates to multiple structures. This term is also only peripherally useful, but is provided in the context of alternate solutions as described above.

File system: a software component which manages a defined set of disks (or other media) and provides access to data in ways to facilitate consistent addition, modification and deletion of data and data files. The term is also used to describe the set of data and metadata contained within a specific set of disks (or other media). While the present invention is typically used most frequently in conjunction with rotating magnetic disk storage systems, it is usable with any data storage medium which is capable of being accessed by name with data located in nonadjacent blocks; accordingly, where the terms "disk" or "disk storage" or the like are employed herein, this more general characterization of the storage medium is intended.

Snapshot: a file or set of files that capture the state of the file system at a given point in time.

Metadata controller: a node or processor in a networked computer system (such as the pSeries of scalable parallel systems offered by the assignee of the present invention) through which all access requests to a file are processed. This term is provided for completeness, but is not relevant to an understanding of the operation of the present invention.

SUMMARY OF THE INVENTION

In accordance with a preferred embodiment of the present invention a method for accessing a file system is provided. This method comprises the steps of creating an entry for a file with limited attributes and with no data but for which there is provided an indication that said file is in an unrestored state; and permitting file system operations on said file, said operations being selected from the group consisting of (1) listing file names for the file; and (2) removing the file. A significant aspect of this method is the creation of what is, in effect, a place keeper entry in the file system. This entry, with its indication of having an unrestored state, provides a mechanism for continued operations with respect to files for which this status has been changed from "unrestored" to "restored."

In accordance with another aspect of the present invention, a method is provided for restoring a file system. This method comprises, during the file system restoration process, the step of changing, for each file restored, a file status indicator from an unrestored indication to a restored indication following the restoration of the file. This method also preferably includes the further step of permitting immediate access to a file for which the status indicator indicates that the file is in a restored state, even as the file system restoration process continues for other files. If an application program accesses a file that is in the unrestored state, an event is presented to the file restore software which immediately and synchronously restores the file, turns the indicator to reflect a restored state and returns the event "complete." While this event is being processed, the application request to access the file is held in abeyance. When the event is complete, the application request is honored if the file has successfully been restored or denied if the restore failed for some reason (for example, there is a bad tape). Except for the slight delay, the application program is not aware that a file had to be restored for this purpose. The methods cited in patent applications US 2002/0124013 published on Sep. 5, 2002 (Ser. No. 09/887,533, filed Jun. 25, 2001) and US 2002/0143734 published on Oct. 3, 2002 (Ser. No. 09/887, 520, filed Jun. 25, 2001, and which is a divisional of Ser. No. 09/887,533; both applications filed based off of a provisional application Ser. No. 60/214,127, filed Jun. 26, 2000) and US 2002/0123997 published on Sep. 5, 2002 (Ser. No. 09/887550, filed Jun. 25, 2001, based off of a provisional application Ser. No. 60/214,127, filed on Jun. 26, 2000) provide a mechanism for presenting these events and for delaying the application execution until the event processing is complete even across multiple computers mounting the same file system. The present invention exploits these facilities to provide the ability to restore damaged file systems. For files which are accessed during a file system restoration operation which have a status indicator set to reflect that it is in a restored state, full file system operations are allowed. In this manner, as much file access as is possible is permitted and carried out throughout the entire duration of the restoration process. In this way, continued application program execution using any file in the file system is possible as soon as the file system metadata is restored. Application execution may require an "on demand" restoration of data synchronous to the application request if the specific data requested has not yet been restored. It is no longer necessary for all of the application programs to have to wait until full file system restoration has been achieved.

Accordingly, it is an object of the present invention to permit both limited and complete file access during file system restoration operations.

It is also an object of the present invention to permit, as much as possible, continued application program operation during file system restoration.

It is another object of the present invention to increase the flexibility of both file system backup and restoration facilities.

It is yet another object of the present invention to increase the efficiency of operation in distributed and/or parallel data processing systems.

It is a further object of the present invention to permit removal of files that are nonetheless present only in an unrestored state.

It is a still further object of the present invention to permit the listing of files that are nonetheless present only in an unrestored state.

It is also an object of the present invention to provide enhanced data structures for file systems to enhance their backup and restoration capabilities.

It is yet another object of the present invention to provide systems and program products for carrying out the file system restoration methods disclosed herein.

It is a further object of the present invention to exploit data structures that are created during file backup operations, particularly backup operations for large file systems.

Lastly, but not limited hereto, it is an object of the present invention to improve file system access and availability throughout data processing operations that perform file system restoration.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

In order to provide a better understanding of the environment and the operation of the present invention, relevant parts and structures of the above-mentioned General Parallel File System (GPFS) are briefly reviewed. It is also noted that GPFS is similar to file systems conforming to the Xopen file system standard, and accordingly all such file systems are usable with the present invention. However, the present invention is not limited to such file systems. In general, it is noted that a file is composed of three basic parts: its attributes, its data and its name. In general, these three parts are stored in different places in various file system. The file's attributes, such as the file size, its creation time and its access permission, are stored in a file structure generally referred to in the file system arts as an inode. There is one inode file per file system. The inode also stores pointers to the file's data blocks, that is, pointers which indicate a physical location in a storage system or on a particular storage device. A single file may contain any amount of data, from none at all, up to $2^{64}$ bytes (the current limit in almost all presently available data processing systems). The file's name is stored in a separate structure called the file system directory. A directory entry maps a user assigned name for a file, for a directory or for a subdirectory to the inode that stores that file. In GPFS, the directory entry also contains a target type field to quickly distinguish files from directories. The directory structure forms a hierarchical name space and defines a path to identify the file. A file may have more than one name. Note that the directory structure (which contains the file names) is stored in regular file system files, but has attributes to distinguish its data from "regular" data blocks.

Figure 1:
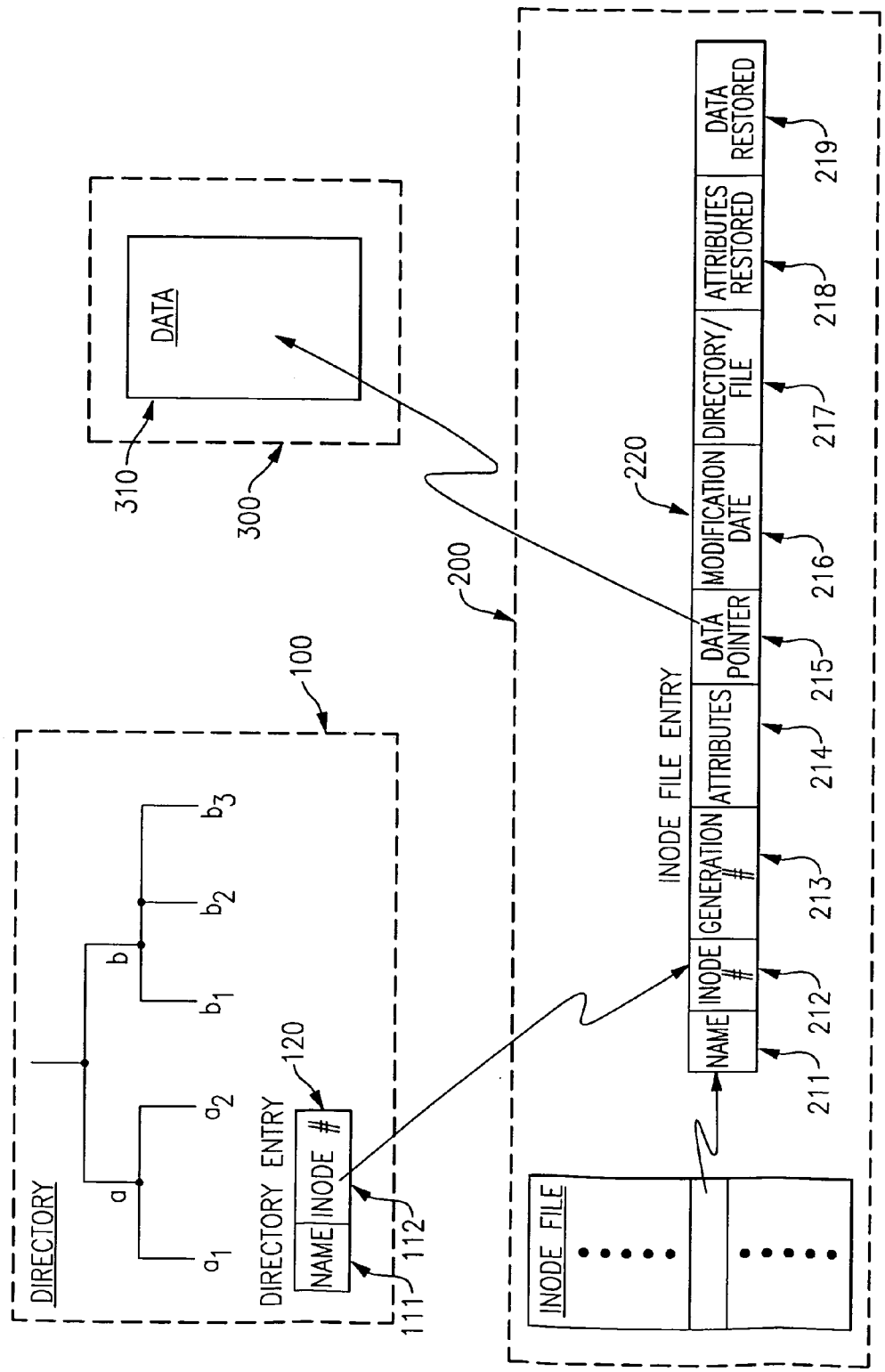
FIG. 1 is a block diagram illustrating file system structures exploited by the present invention.

FIG. 1 more particularly illustrates the principle elements in a file system. A typical file system, such as the one shown, includes directory tree 100, inode file 200 and data 300. These three elements are typically present in a file system as files themselves. For example as shown in FIG. 1, inode file 200 comprises a collection of individual records or entries 220. There is only one inode file per file system. In particular, it is the one shown on the bottom of FIG. 1 and indicated by reference numeral 200. Entries in directory tree 100 include a pointer, such as field 112, which preferably comprises an integer quantity which operates as a simple index into inode file 200. For example, if field 112 contains a binary integer representing, say "10876," then it refers to the $10876^{th}$ entry in inode file 200. Special entries are employed (see reference numeral 216 discussed below) to denote a file as being a directory. A directory is thus typically a file in which the names of the stored files are maintained in an arbitrarily deep directory tree. With respect to directory 100, there are three terms whose meanings should be understood for a better understanding of the present invention. The directory tree is a collection of directories which includes all of the directories in the file system. A directory is a specific type of file, which is an element in the directory tree. A directory is a collection of pointers to modes which are either files or directories which occupy a lower position in the directory tree. A directory entry is a single record in a directory that points to a file or directory. In FIG. 1, an exemplar directory tree is illustrated within function block 100. An exemplar directory entry contains elements of the form 120, as shown; but see also FIG. 3 for an illustration of a directory entry content for purposes of the present invention. While FIG. 1 illustrates a hierarchy with only two levels (for purposes of convenience) it should be understood that the depth of the hierarchical tree structure of a directory is not limited to two levels. In fact, there may be dozens of levels present in any directory tree. The depth of the directory tree does, nevertheless, contribute to the necessity of multiple directory references when only one file is needed to be identified or accessed. However, in all cases the "leaves" of the directory tree are employed to associate a file name (reference numeral 111) with entry 220 in inode file 200. The reference is by "inode number" (reference numeral 112) which provides a pointer into inode file 200. There is one inode array in file systems of the type considered herein. In preferred embodiments of the present invention the inode array is inode file 200 and the index points to the array element. Thus inode #10876 is the $10876^{th}$ array element in inode file 200. Typically, and preferably, this pointer is a simple index into inode file 200 which is thus accessed in an essentially linear manner. Thus, if the index is 108767, this points to the $10876^{th}$ record or array element of inode file 200. Name entry 111 allows one to move one level deeper in the tree. In typical file systems, name entry 111 points to, say inode #10876, which is a directory or a data file. If it is a directory, one recursively searches in that directory file for the next level of the name. For example, assume that entry 111 is "a," as illustrated in FIG. 1. One would then search the data of inode #10876 for the name entry with the inode for "a2." If name entry 111 points to data, one has reached the end of the name search. In the present invention, name entry 111 includes an additional field 113 (See FIG. 3) which indicates whether this is a directory or not. The directory tree structure is included separately because POSIX allows multiple names for the same file in ways that are not relevant to either the understanding or operation of the present invention.

Directory tree 100 provides a hierarchical name space for the file system in that it enables reference to individual file entries by file name, as opposed to reference by inode number. Each entry in a directory points to an inode. That inode may be a directory or a file. Inode 220 is determined by the entry in field 112 which preferably is an indicator of position in inode file 200 (as described above). Inode file entry 220 in inode file 200 is typically, and preferably, implemented as a linear list. Each entry in the list preferably includes a plurality of fields: inode number 212, generation number 213, individual file attributes 214, data pointer 215, date of last modification 216 and indicator field 217 to indicate whether or not the file is a directory. Other fields not of interest or relevance to the present invention are also typically present in inode entry 220. However, the most relevant field for use in conjunction with the companion invention in application Ser. No. 10/602156 is field 216 denoting the date of last modification. The inode number is unique in the file system. The file system preferably also includes generation number 213 which is typically used to distinguish a file from a file which no longer exists but which had the same inode number when it did exist. Inode field 214 identifies certain attributes associated with a file. These attributes include, but are not limited to: date of last modification; date of creation; file size; file type; parameters indicating read or write access; various access permissions and access levels; compressed status; encrypted status; hidden status; and status within a network. Inode entry 220 also includes entry 216 indicating that the file it points to is in fact a directory. This allows the file system itself to treat this file differently in accordance with the fact that it contains what is best described as the name space for the file system itself Most importantly, however, typical inode entry 220 contains data pointer 215 which includes sufficient information to identify a physical location for actual data 310 residing in data portion 300 of the file system.

With specific reference to the structure and operation of the present invention, the inode entries include fields for indicating the restoration status of the file in question. In particular, field 218 in FIG. 1 provides an indication of whether or not the attributes for the subject file are in a restored state. Likewise, field 219 in FIG. 1 provides an indication of whether or not the data for the subject file is in a restored state. As described more particularly below, the present invention contemplates the situation in which, during a file system restoration operation, a file's attributes are made available prior to the availability of the data in the file. Accordingly, distinct fields 218 and 219 are provided for this purpose. If this feature is not needed or desired, different implementations of the present invention may employ only one such field to indicate the restoration state as it applies to both attributes and data.

However, in general, it is seen that a complete restoration of a file system involves restoring the file names, the attributes and the data for all of the files in the file system. A file without its name cannot be accessed. However, in less severely impaired circumstances, if a file's attributes or data were missing, the file system or application program normally gets an error indication if it tries to access the file.

This present invention provides a means to independently restore a file's name, attributes and data. It employs an interface to the file system which is used to create a file with no attributes and no data and which reflects a file in an unrestored state. The only actions allowed on these files in the unrestored state is the listing of their names or the removal of the file from the file system. Since the file system is able to identify these unrestored files, it is thus able to permit application programs to begin execution before all of the files are restored. A program accessing an unrestored file either provokes an event to a data management application capable of restoring the file's attributes or data or the program receives a return code indicating that the file can not be currently accessed. While it is possible for the failure situation to be addressed so as to allow the restoration program to reorder the scheduling so as to position higher priority files for earlier restoration, in practice failure is more typically seen to arise from the relatively simple error scenario in which a tape cannot be read or in which a tape is not available.

There are a number of ways to implement a rapid file system restore, which show the tradeoffs in quickly restarting applications at a potential cost of suspending the user application and taking longer for the full restoration to complete.

Figure 2:
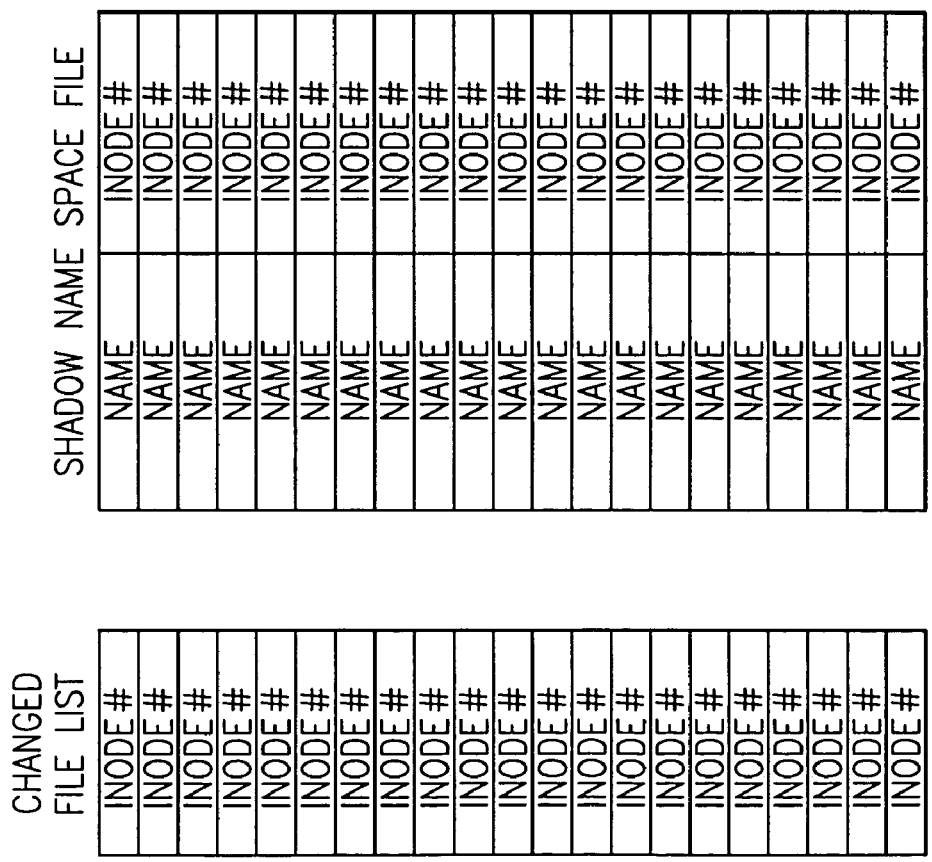
FIG. 2 is a block diagram illustrating the structure of two additional structures employable in conjunction with rapid and efficient backup operations which are now usable in a form which permits both the retrieval of large blocks of data structure descriptions and which also permits partitioning of the backup task into a plurality of independent operations.

Initially, a new, empty file system is created. Next, all directory entries are restored using the shadow file (reference numeral 500 in FIG. 2) created, for example, during a file system backup operation as recited in the concurrently filed companion application which is more particularly described below beneath the heading "The Related Backup Process." Next, the key attributes of the files are restored from the backup system to each inode which has backed up data. These attributes include size, owner and access permission. No data is restored as part of this step and the file is marked as being unrestored. Application access is only allowed after this point of the restoration is complete. This includes lists and directory lookups. The use of Namespace file 500 allows the entire namespace to be restored in parallel. The file system may thus be made available to user applications, even across a distributed system. Applications which access an unrestored file attribute or file data are temporarily suspended until the requested file is restored. However, an application program is allowed to remove an unrestored file and does not need to wait to do so. The file is marked as deleted and the restore avoided.

One or more restore processes are started to restore all file attributes and data. A "quick" restore process may restore only the file's attributes (and not its data). More than one quick restore process may be run to allow them to restore the file attributes in parallel. A quick restore of just the file's attributes allows the permission checking to occur as well as allowing the users to stat( ) files without waiting. Stat( ) is a operating system call specified by the Xopen file system standard which returns attributes of a file; but returns no data. One or more "full" restore processes should also be run to restore a file's data. These restores may be done in inode order or in the order the files are stored on off-line tapes. Additional processes may also be spawned to restore large files in parallel.

Restoring an individual file is done in much the same manner. The user identifies the files to be restored. Each file is inserted into the namespace (if it is not already). Any existing data or attributes are deleted and the file is marked to indicate its unrestored state. The file system then preferably schedules a "full" restore process to run in parallel with the user's access to the files.

The present invention includes one totally new program-implemented function together with the utilization of other functions present in GPFS. These functions are described in the patent applications referred to elsewhere herein as US 2002/0124013 published on Sep. 5, 2002 (Ser. No. 09/887,533, filed Jun. 25, 2001) and US 2002/0143734 published on Oct. 3, 2002 (Ser. No. 09/887,520, filed Jun. 25, 2001, and which is a divisional of Ser. No. 09/887,533; both applications filed based off of a provisional application Ser. No. 60/214,127, filed Jun. 26, 2000) and US 2002/0123997 published on Sep. 5, 2002 (Ser. No. 09/887550, filed Jun. 25, 2001, based off of a provisional application Ser. No. 60/214, 127, filed on Jun. 26, 2000). These published applications specify a mechanism for synchronously presenting an event to an external data management application across multiple nodes which mount the same file system. This is triggered by an application call and the application is suspended until the event is processed. The flow here is that an on-demand restore application is started on a node in the GPFS cluster which registers to handle these events. There may be more than one application for this particular event. The process flow is that an application running on node A of the cluster tries to read a file which has not yet been restored. The file system on node A recognizes that the file is "unrestored" and knows that the on-demand restore application has registered on node Z. It sends an event to node Z and suspends the processing of the originating application. Node Z presents the event to the on-demand restore application which reads the backup copy, writes the data to the file system and marks the file as being "restored." It then completes the event on node Z which notifies node A to resume the application and thus satisfies the read request.

The interface provided herein includes the ability to create a set of named files with specified inode numbers that have no attributes and no data. These file skeletons are created in a state that reflects their status as unrestored. The only action that is taken on these files without a restore is the listing of its name or the deletion of the file. Other operations either provoke an event to a data management application capable of restoring the file or cause the generation of a return code which indicates that the file cannot be accessed.

The interface is more particularly described as follows: the first set of calls writes metadata (attributes) to an inode specified by inode number. The interface formats are of the form:

Mmwrite_inode (atttribute_structure, inode_num)

Where the attribute structure contains the data saved with the shadow file explicitly including:
Size
Permissions
Owner
Unrestored bit
Time last modified and accessed
Type (regular file, directory)

AND
Mmwrite_dir (dir_name, entry_name, inode_num, type)

This has the semantics of writing an entry in the directory specified by dir_name with the name entry_name which points at the inode number specified by inode_num which has the type (directory, file or link) specified by Type.

The existing functions that are relevant to the present invention include the ability to rapidly generate a list of file names which comprise the entire namespace of the file system. This is described in the companion application Ser. No. 10/602156 filed concurrently herewith. Although the namespace file as described therein is not required, it does serve to speed up the restore process. The present invention also preferably employs the ability to present events from a parallel system to a hierarchical storage manager as described in previously submitted patent applications (published patent applications US 2002/0124013 published on Sep. 5, 2002 (Ser. No. 09/887,533, filed Jun. 25, 2001) and US 2002/0143734 published on Oct. 3, 2002 (Ser. No. 09/887,520, filed Jun. 25, 2001, and which is a divisional of Ser. No. 09/887,533; both applications filed based off of a provisional application Ser. No. 60/214,127, filed Jun. 26, 2000) and US 2002/0123997 published on Sep. 5, 2002 (Ser. No. 09/887550, filed Jun. 25, 2001, based off of a provisional application Ser. No. 60/214,127, filed on Jun. 26, 2000)). The present invention also defines a new event class presented through the Data Management Application Programming Interface (DMAPI) interfaces described in the two aforementioned patent applications. This event class reflects the type of access (file data access or file attribute access) so that the data management application is configured with policies allowing it to fail certain events. If the data management application chooses to fail an event, the application receives a failure. If the data management application responds successfully to the event, the application request is retried. The expected response from the data management application is that it restores the data associated with the file, restores the file attributes (owner, permissions, etc.) and clears the special state which marks the file as unrestored. This results in slower response by an application, but should not result in application failures for any application which is not real time sensitive. The frequency of these application slowdowns decreases as more of the files are staged back to a restored state either by data management events or by normal restore processing. Note that files can be removed prior to being restored and that the data management application recognizes that condition and does not restore the deleted file.

The Related Backup Process

As discussed above, preferred embodiments of the present invention take advantage of a table that is created as part of a file system backup process as is more particularly described in companion application Ser. No. 10/602156 Attention is now focused on the construction of that table and its use in the related invention.

(1) In the companion invention inode file 200 is read in much the same way as backup by inode does, generating list 400 (see FIG. 2) of inodes that have changed. This results in a list of modes which meet the backup criteria. However, unlike backup by inode, the companion invention does not do a backup using inode number as the key.

Figure 3:
FIG. 3 is a block diagram illustrating a structure usable in a file system directory for distinguishing files and directory or subdirectory entries.

(2) In the companion invention, an additional step is employed in which directory name space 100 is read to generate table 500 (see FIG. 2) of file names containing the name for every file in the file system together with its corresponding inode number. When reading the directory, the companion invention employs the directory entry's newly provided target-type field 113 as seen in FIG. 3. Traditional file systems do not keep an indicator in the directory entry of whether or not the target is a directory or a file. That information is generally kept only in the inode file, hence the requirement for reading the inode. In the operation of the companion invention field 113 is therefore provided so as to identify subdirectories without having to read every active inode, thus also providing one of the major advantages of the companion method. The result of the directory scan is table 500 which has names and inode numbers for all files currently in the file system. This scan is taken either on the current active file system or on a snapshot of the file system.

(3) The companion invention sorts resulting shadow name space table 500 by inode number. This allows one to easily merge name space table 500 with inode list 400, table thereby creating a list of file names that point to files that are to be backed up.

(4) The structure and content of the resulting merged table provides the companion invention with the extra ability to divide the merged table into equal parts based on the number of files and on the size of each file and to then invoke a number of parallel backup job "worker threads" which perform the backup in parallel across multiple nodes of the file system (GPFS, for example). The division of the table into "equal" portions is done by estimating the time required by each file. The time estimate is preferably based on the following calculation (but note that the exact form of this calculation is not critical):

$$\text{Time} = \text{base\_time} + (\text{time/byte}) * (\text{number of bytes})$$

where, base_time is the estimated time required to backup a one byte file and time/byte is an estimate of the incremental time required to backup additional bytes. This aspect of the companion invention, while preferable is optional.

(5) If the backup is to be spread across multiple backup repositories, it is desired that each file be sent to the same repository every time. On a base backup, the file name space is broken into approximately equal portions for each repository and a file remains associated with that repository until the next base backup. This mapping is preferably added to the original name space table. This aspect of the companion invention, while preferable is also optional. The partitioning is carried out arbitrarily on a specified base backup. If one has n repositories, the shadow file is split into n pieces of approximately the same load as specified in item (4) above. One then employs m worker threads which move data to n repositories where m is ideally some multiple of n such that each repository is capable of completing the backup in a desired amount of time.

(6) The mapping from file names to backup repositories is preferably changed to allow the backup workload to be rebalanced. When the mapping changes, existing backup version of a file are preferably moved to their new repository, but it is not required. This aspect of the present invention, while preferable is optional as well.

(7) The name space table is saved for use in the next backup. By comparing the name space of the current backup with the prior backup, deleted and renamed files are easily detected and the correct backup action is taken according to standard backup policies. This aspect of the companion invention, while preferable is also optional, particularly when considering the invention in its broadest scope.

From the above it should be appreciate that the objects of the present invention are achieved through the methods and systems described above. In particular, it is seen that the present invention provides a much more flexible file system restoration operation in that file access is permitted during he restoration process itself. Furthermore, it is seen that the degree of file access permitted is also made more flexible, especially if all that is needed is access to a file's attributes. It is also noted that file system restoration flexibility is also enhanced through the use of a namespace table that is created during file system backup operations as disclosed in a companion application. File system restoration flexibility is also improved in the sense that the order of file restoration may be modified in response to access requests made during the file restoration process.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method of accessing a file system, said method comprising the steps of:
    creating an entry for a file with limited attributes and no data and for which there is provided an indication that said file is in an unrestored state;
    accessing said file during file system restoration; and
    based on said indication determined from said accessing, permitting file system operations on said file, said operations being selected from the group consisting of (1) listing file names for any such file; and (2) removing any such file.

2. The method of claim 1 further including the steps of restoring said file having an unrestored state indication and changing said indication to reflect its restored status.

3. A method for restoring a file system comprising, during said restoration, the step of changing, for each file restored, a file status indicator from an unrestored indication, to a restored indication, and during said file system restoration providing access to an unrestored file which is accessed solely by file system structure information without data being present in the file prior to said access request being made.

4. The method of claim 3 further including the step of temporarily suspending access, to a file for which said status indicator indicates that said file is in an unrestored state, until said file is restored.

5. A method of accessing a file system, said method comprising the steps of:
    creating an entry for a file with no attributes and no data and for which there is provided an indication that said file is in an unrestored state;
    accessing said file during file system restoration; and
    based on said indication determined from said accessing, listing a file name for said file.

6. A method of accessing a file system, said method comprising the steps of:
    creating an entry for a file with no attributes and no data and for which there is provided an indication that said file is in an unrestored state;
    accessing said file during file system restoration; and
    based on said indication determined from said accessing, removing a file name assigned to said file.

7. A method of accessing a file system, said method comprising the step of:
    during restoration of said file system, upon access directed to a file in said system which possesses an indication of not yet being restored, restoring said file and changing said indication to reflect its restored status and accessing said file during the restoration of said file system.

8. A method of accessing a file system, said method comprising the step of during restoration of said file system containing entries for at least one file with limited attributes and no data, upon access directed to said at least one file in said system which possesses an indication of not yet being restored, removing said file from said file system and skipping restoration of said file.

9. A method of accessing a file system, said method comprising the step of during restoration of said file system containing entries for at least one file with limited attributes and no data, upon access directed to said at least one file in said system which possesses an indication of not yet being restored, adjusting scheduled file system restoration priority so that said accessed file is restored earlier within said scheduled sequence.

10. A method for restoring a file system comprising the steps of:
    creating an empty file system in which file system modes are marked to indicate that neither file attributes nor file data are indicated as being restored;
    initializing a namespace for the file system;
    restoring a root directory for the file system;
    restoring at least one file in said file system and providing an indication that said file's attributes and data are restored; and
    accessing said file during said file restoration.

11. The method of claim 10 further including the step of suspending access to said file in said file system until data in said file is restored.

12. A method for restoring a file system comprising the steps of:
    creating an empty file system in which file system modes are marked to indicate that neither file attributes nor file data are indicated as being restored;
    initializing a namespace for the file system;
    restoring file system directory information for all of said file system;
    restoring at least one file in said file system and providing an indication that said file's attributes and data are restored; and
    accessing said file during said file restoration.

13. The method of claim 12 in which said restoring of said file system directory information is carried out recursively.

14. A method for restoring a file system comprising the steps of:
    creating an empty file system in which file system inodes are marked to indicate that neither file attributes nor file data are indicated as being restored;
    restoring said file system using a previously created table containing associated file names and inode numbers; and
    processing in disjoint portions by different data processing nodes, whereby said restoration is carried out in parallel.

15. The method of claim 14 further including the step of spawning at least one other process to carry out said file system restoring.

16. A method for restoring a file system comprising the steps of:
  creating an empty file system in which file system modes are marked to indicate that neither file attributes nor file data are indicated as being restored; and
  restoring at least one file in said file system in a fashion in which attributes for said file are restored but for which data for said file is restored at a later time.

17. The method of claim 16 further including the step in which an application program accesses said file to ascertain said files attributes but not the data content of said file.

18. A method for restoring a file system comprising the steps of:
  creating an empty file system in which file system modes are marked to indicate that neither file attributes nor file data are indicated as being restored;
  accessing said file during file system restoration; and
  based on said indication determined from said accessing, restoring at least one file in said file system using a previously created table containing associated file names and inode numbers.

19. The method of claim 18 in which file restoration is carried out for all of the files in said file system.

20. The method of claim 18 in which file restoration is carried out for a plurality of files in said file system.

21. The method of claim 19 in which said file restoration occurs in an order specified in said previously created table.

22. The method of claim 21 in which said file restoration occurs from files stored in a given order on another medium and said restoration occurs in an order based on the order present on said other medium.

23. The method of claim 22 in which said medium is tape.

24. The method of claim 18 in which said table was generated in a previously carried out file system backup operation.

25. A computer program product, for file system restoration, stored on a machine readable medium having program means thereon for (1) creating an entry for a file with no attributes and no data and for which there is provided an indication that said file is in an unrestored state; (2) accessing said file during file system restoration; and (3) based on said indication determined from said accessing, permitting file system operations on said file, said operations being selected from the group consisting of (a) listing a file name for said file; and (b) removing of said file.

26. A computer program product, for file system restoration, stored on a machine readable medium having program means thereon for performing, during said restoration and upon access directed to a file in said system which possesses an indication of not yet being restored, the step of restoring said file and changing said indication to reflect its restored status.

27. A data processing system comprising:
  a central processing unit;
  a random access memory for storing data and programs for execution by said central processing unit;
  a nonvolatile storage device;
  program means for file system restoration, said program means being stored on a machine readable said program means including means for (1) creating an entry for a file with no attributes and no data and for which there is provided an indication that said file is in an unrestored state; (2) for accessing said file during file system restoration; and (3) for permitting, based on said indication determined from said accessing, file system operations on said file, said operations being selected from the group consisting of (a) listing a file name for said file; and (b) removal of said file.

28. A data processing system comprising:
  a central processing unit;
  a random access memory for storing data and programs for execution by said central processing unit;
  a nonvolatile storage device;
  program means for file system restoration, said program means being stored on a machine readable medium, for performing, during said restoration, and upon access directed to a file in said system which possesses an indication of not yet being restored, the step of changing, for each file restored, a file status indicator from an unrestored indication, to a restored indication, following said file restoration of said accessed file.

* * * * *